United States Patent
Fishman et al.

[11] Patent Number: 6,084,869
[45] Date of Patent: *Jul. 4, 2000

[54] RESOURCE RESERVATION FOR PACKET-SWITCHED MULTIPLE-PATH COMMUNICATION SYSTEM

[75] Inventors: Barry Fishman, San Pedro; James E. Justiss, Rancho Palos Verdes, both of Calif.

[73] Assignee: Hughes Electronics Corporation, El Segundo, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/944,357

[22] Filed: Oct. 6, 1997

[51] Int. Cl.⁷ .................................................. H04L 12/28
[52] U.S. Cl. .......................... 370/348; 370/432; 455/450
[58] Field of Search .................................. 370/350, 322, 370/349, 324, 329, 337, 347, 348, 432, 462; 455/428, 450, 12.1, 13.2, 509, 512

[56] References Cited

U.S. PATENT DOCUMENTS

| | | | |
|---|---|---|---|
| 5,517,505 | 5/1996 | Buchholz et al. | 370/349 |
| 5,784,597 | 7/1998 | Chiu et al. | 370/252 |
| 5,875,178 | 2/1999 | Rahuel et al. | 370/313 |
| 5,875,182 | 2/1999 | Hatzipapafotiou | 370/321 |
| 5,883,901 | 3/1999 | Chiu et al. | 370/508 |

*Primary Examiner*—Hassan Kizou
*Assistant Examiner*—Daniel Previl
*Attorney, Agent, or Firm*—T. Gudmestad; M. W. Sales

[57] ABSTRACT

A method and system for reserving channel resources in a random-access, multiple-path communication system utilizes a transmit group addressing arrangement for a reservation packet. A transceiver terminal wanting to transmit a signal must first send a reservation request packet to a packet router. Each reservation request packet includes an address header identifying the entire group of terminals to which the transmitting terminal belongs as the destination for the reservation request packet, and a data segment identifying the terminal and the channel resources to be reserved. After the reservation request packet is transmitted to the packet router, each terminal in the transmit group will determine the order of transmission depending on the sequence in which all reservation packets are received from the router. When a terminal begins transmission, a synchronization packet is sent as an indicator for allowing the remaining terminals to predict the end of transmission.

16 Claims, 3 Drawing Sheets

RESOURCE RESERVATION FOR PACKET-SWITCHED MULTIPLE-PATH COMMUNICATION SYSTEM

TECHNICAL FIELD

The present invention relates to multiple access, packet-switched multiple-path communication systems, and more particularly, to a resource reservation protocol which improves throughput of transmitted signals in such a communication system.

BACKGROUND ART

Generally, communication systems in which numerous transceiver terminals share the total available transmission capacity must employ some form of resource access control protocol to achieve an efficient use of that capacity. For example, in packet radio systems having bursty traffic, i.e. short sporadic transmissions, contention type protocols such as ALOHA, slotted ALOHA, and CSMA (carrier sense multiple access) are utilized to control access to channels resources.

Alternatively, or in combination therewith, access control can be provided through a channel reservation protocol, such as reservation ALOHA and related variant protocols like Priority Oriented Demand Assignment (PODA). These protocols typically require a group of resource competing transmitting terminals to listen to their own transmissions in order to receive any reservation information.

While such contention protocols improve utilization efficiency, problems arise in multiple-path or multiple-beam communication systems because a source and destination terminal can reside on different paths or beams. Thus, a transmitting terminal may not be able to receive any of its own transmissions. As a result, conventional reservation protocols such as reservation ALOHA or PODA will not provide a satisfactory level of access sharing and system utilization, because the only way to ensure receipt of the requisite reservation information is to have the destination terminal relay the reservation information back to the transmitting terminal. Such an arrangement can double the delay time for receipt of the reservation information, reduce terminal throughput, and use additional bandwidth.

DISCLOSURE OF THE INVENTION

It is therefore an object of the present invention to provide a method and system for reserving channel resources in a packet-switched multiple-path communication system which overcomes the deficiencies of known reservation protocols.

It is another object of the present invention to provide a method and system for reserving channel resources in a packet-switched multiple-path satellite communication system which does not require any special adaptations of a packet routing controller.

It is yet another object of the present invention to provide a method and system for reserving channel resources in a packet-switched multiple-path satellite communication system which reduces the amount of time needed to communicate reservation information amongst competing terminals.

It is still another object of the present invention to provide a method and system reservation of channel resources in a packet-switched multiple-path satellite communication system which does not require a receiving/destination terminal to relay back any reservation information.

In accordance with these and other objects, the present invention provides a random-access multiple-path communication system having a plurality of transceiver terminals that communicate with each other. A packet router is provided for routing transmitted signals to a destination transceiver terminal. A method is provided for reserving temporary possession of channel resources for transmission between a group of terminals which includes, in each transmitting terminal, assembling a reservation request packet including an address header identifying the entire group of terminals as the destination terminal for the packet, and a data segment identifying the terminal and the channel resources, such as a time slot or a period of time; to be reserved. After the reservation request packet is transmitted to the packet router, the order of transmission is determined depending on the sequence in which all reservation packets are received from the router.

In accordance with another aspect of the present invention, a random-access, multiple-path communication system includes a plurality of transceiver terminals arranged in respective groups of terminals for sharing predetermined resources of the multiple-path communication system. Each terminal includes a processor and an encoder operative to form a reservation request packet including an address header identifying the entire group of terminals to which the transmitting terminal belongs as the destination for the reservation request packet, and a data segment identifying the terminal and the channels resource being reserved. A packet router communicates with each of the plurality of transceiver terminals using a predetermined one of the multiple paths, and relays all received reservation request packets to the addressed group of terminals. The processor in each of the plurality of transceivers is further operative to determine the order of transmission depending on the sequence in which all reservation packets are received from the router.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
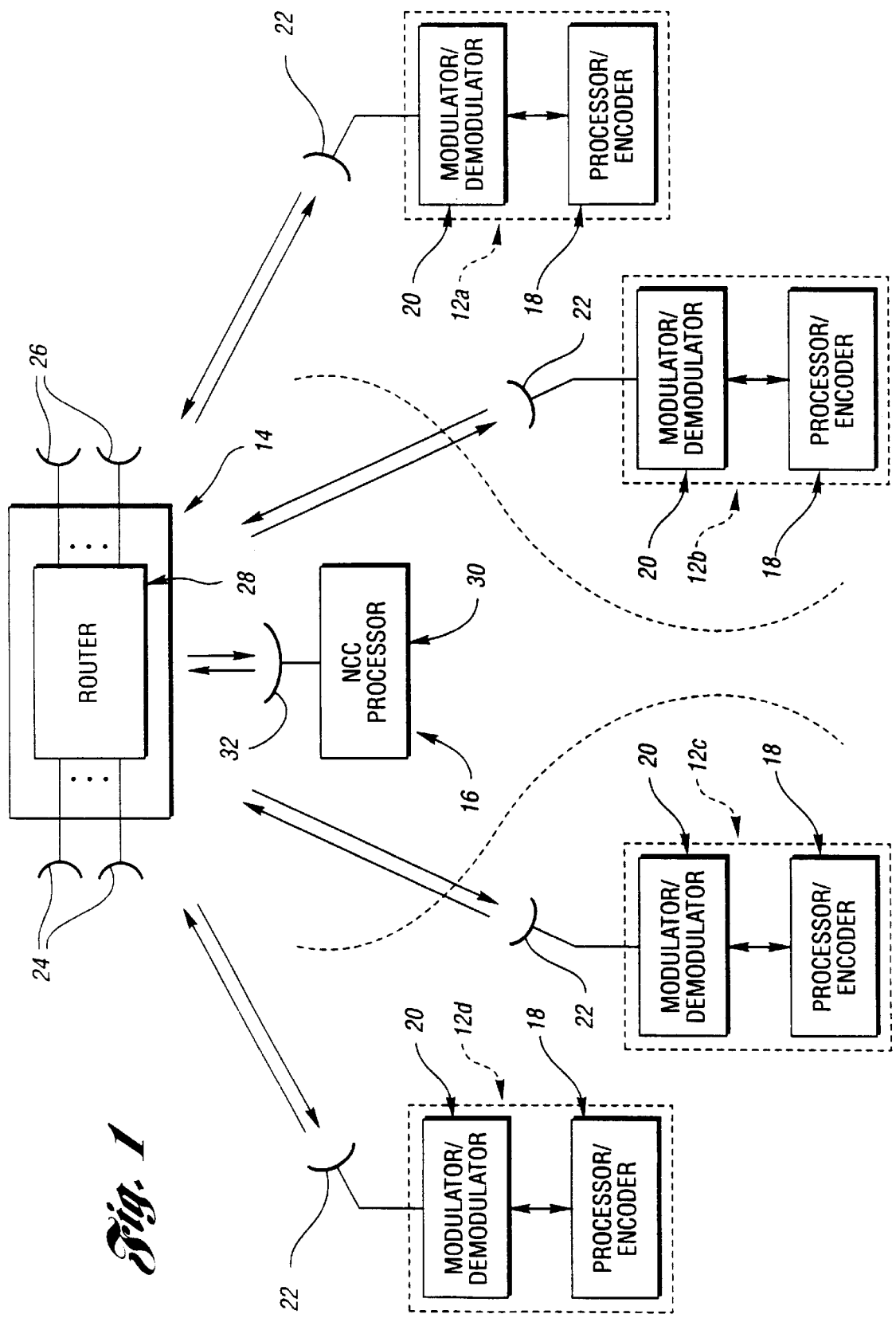
FIG. 1 is a block diagram of an exemplary embodiment of a random access multiple path satellite communication system employing the present invention.

FIG. 1 shows an exemplary embodiment of a high data rate multiple-path satellite communication system 10 into which the present invention may be incorporated. System 10 generally includes a plurality of end-user terminals 12, such as very small aperture terminals (VSATs), that communicate with each other by way of a satellite relay system 14 operating as a packet router. As shown in FIG. 1, terminals 12(a) and 12(b) represent a plurality of terminals which share one of the beams, thereby forming a transmit group. Terminals 12(c) and 12(d) are representative of a plurality of terminals similarly situated with respect to a different beam.

A network control center (NCC) 16 can be provided to coordinate communication between the user terminals 12 and the satellite 14, such as by informing each user terminal as to the identity of their respective transmit group. Frequency-division-multiplexing (FDM), time-division-multiplexing (TDM), or code-division-multiplexing (CDM) can be employed on uplinks from terminals 12 and the NCC 16, and on downlinks from satellite 14, as is generally well understood in the art.

Each end-user terminal 12 includes an encoder/signal processor 18, a transceiver 20 for modulating and demodulating input and output data, and an antenna 22 for transmitting and receiving encoded data to and from satellite relay system 14. Satellite relay system 14 includes a plurality of receive antennas 24, a plurality of transmit antennas 26, and a signal processor 28 serving as the packet router. NCC 16 includes a control processor 30 for generating configuration and control signals that link the user terminals 12 by way of the satellite relay system 14, and an antenna 32 coupled to the control processor 30 for transmitting and receiving the configuration and control signals.

The plurality of receive antennas 24 operate in a first frequency band and produce a first plurality of beams that cover a predefined geographical service area. The plurality of receive antennas 26 receive data from a transmitting user terminal 12 on a first beam. The plurality of transmit antennas 26 operate in a second frequency band and produce a second plurality of beams that cover the predefined service area. The plurality of transmit antennas 26 transmit data to a receiving second user terminal 12 on a second beam.

Signal processor/packet router 28 is arranged to demodulate data received on the first beam from the first user terminal, route the demodulated data so that it is transmitted on the second beam to the second user terminal, remodulate the demodulated data to provide encoded data, and transmit the encoded data on the second beam to the second user terminal.

Figure 2:
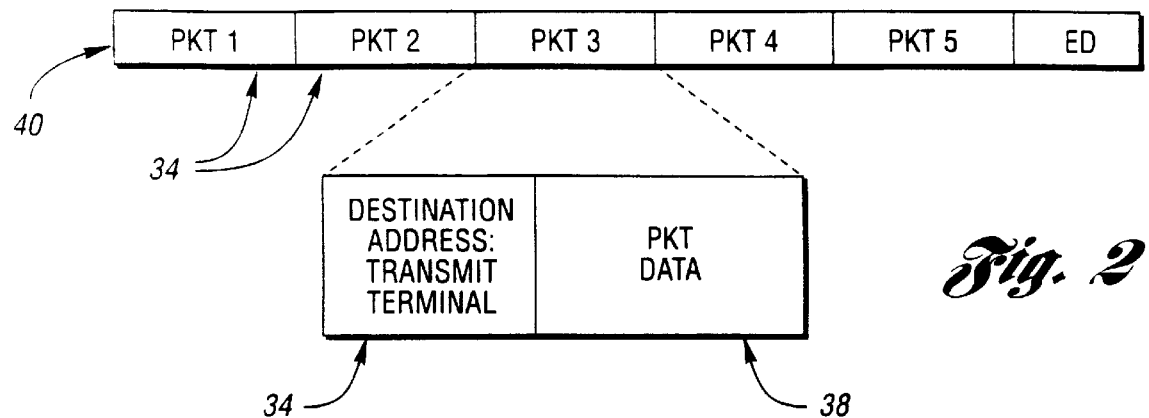
FIG. 2 is a diagram showing a packet transmission arrangement in accordance with the present invention.

As shown in FIG. 2, transmission of data from one terminal to another is performed using a packet-switching type protocol, where data transmissions are divided into smaller packet segments 34 prior to transmission on the uplink. Each packet 34 includes a destination address 36 and a data packet portion 38. A plurality or grouping of packets are then assembled and transmitted in a coded block 40.

Figure 3:
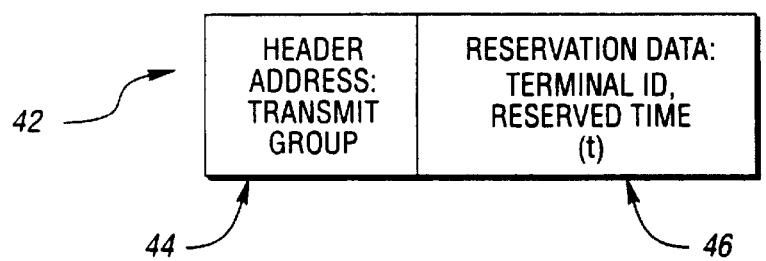
FIG. 3 is a diagram showing a reservation request packet arrangement in accordance with the present invention.
Figure 4:
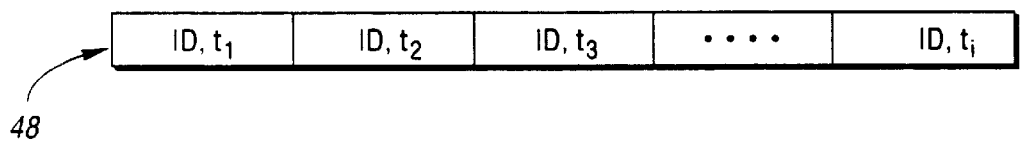
FIG. 4 is a diagram showing a reservation queue in accordance with the present invention.

In accordance with the present invention, each terminal that wants to transmit a signal must first send a reservation request packet addressed to the transmit group assigned to operate on the same beam or path. An example of such a reservation request packet 42 is shown in FIG. 3 having at least an address header portion 44 designating its own transmit group as the destination, and a reservation information portion 46 including identification of the terminal, the channel resource to be reserved, such as a particular time slot, or a period of time (t) of transmission to be reserved, and the starting or ending time of the transmission. With such an arrangement, the present invention is able to ensure that all reservation request packets are received by all terminals of a respective transmit group. In accordance with its normal operation, the routing point, such as the satellite relay system 14, will route all reservations back to the transmit group. In addition, any suitable priority routing protocol can be employed, such as a first-in-first-out (FIFO) priority scheme, or alternative priority sharing schemes which weight the ranking or position of a particular terminal in a reservation queue 48, which is symbolically shown in FIG. 4.

Each terminal 12 subsequently stores and keeps track of the reservations in the sequence they are received so as to know the allocated order of transmission. The reservation queue 48 is constantly updated as new reservation packets are received.

Figure 5:
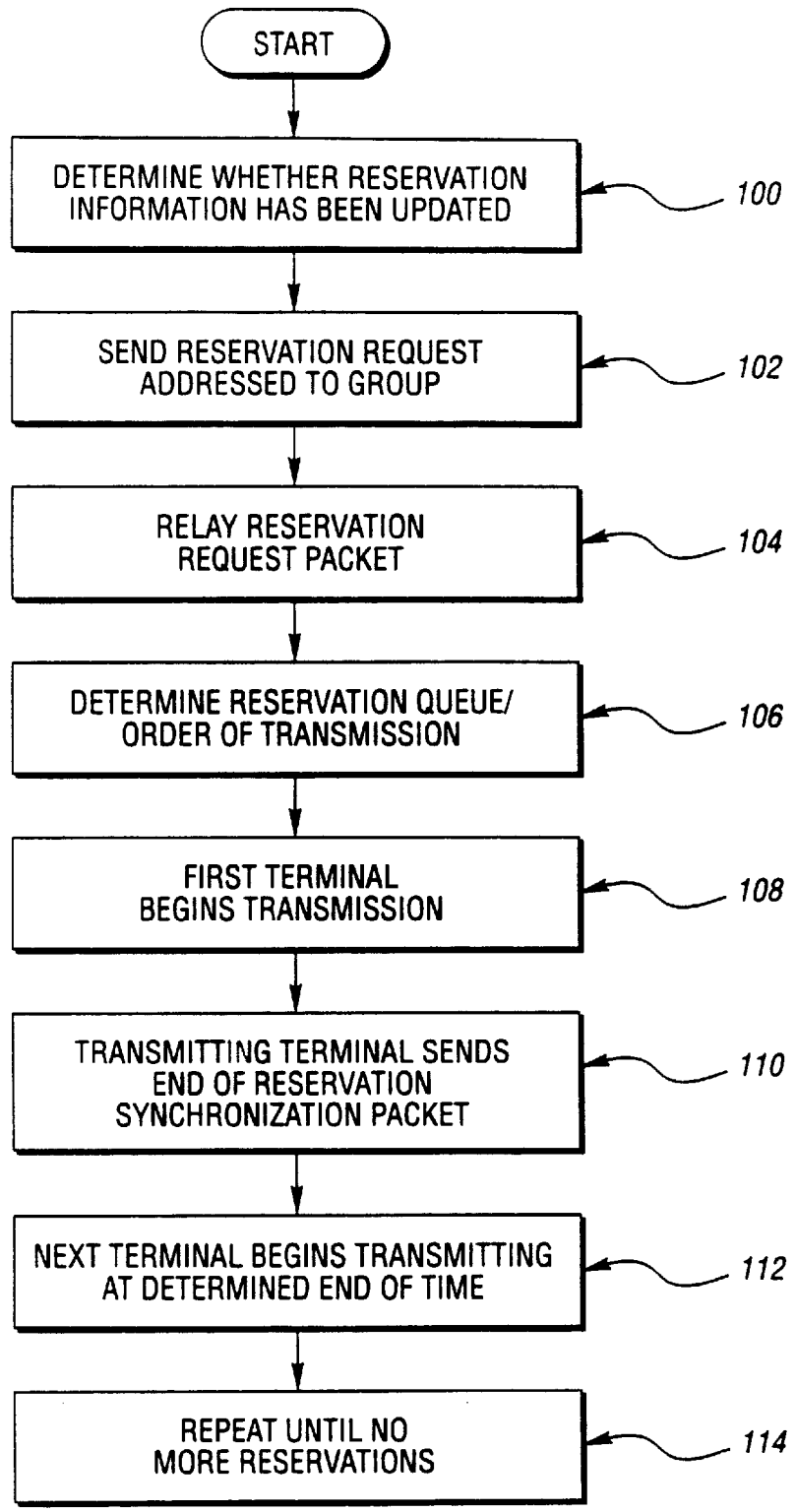
FIG. 5 is a flow chart illustrating the overall operation of the present invention.

FIG. 5 provides a flow chart illustrating the overall operation of the present invention. As shown at block 100, when a terminal wants to transmit a signal, the terminal determines whether its reservation information has been updated before initiating any reservation activity. This process requires the terminal to wait a predetermined period of time to allow such up-to-date information to be received. Then, at block 102 a reservation request packet is assembled, self-addressed to the transmit group, and transmitted to the routing point. At block 104, the router relays the self-addressed packet back to the entire transmit group so that all terminals in the transmit group receive the respective reservation requests.

Figure 6:
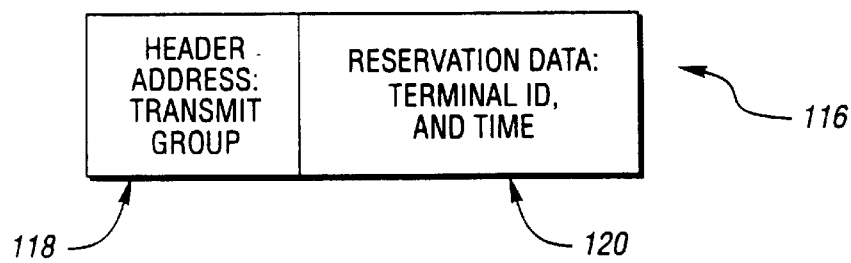
FIG. 6 is a diagram showing a reservation synchronization packet in accordance with the present invention.

As shown at block 106, each terminal in the group updates the reservation queue to determine the order in which the respective terminals will begin to transmit. At block 108, the terminal whose reservation request packet is at the head of the queue begins its transmission using the channel resource specified in the reservation request packet. At block 110, the transmitting terminal will send a synchronization packet while in possession of the reserved channel resource which indicates the terminal currently in possession of the resource and when that possession will end. An example of a synchronization packet 116 is shown in FIG. 6 as having an address header 118 addressing the packet to the entire transmit group, and an information portion 120 conveying the transmitting terminal ID and the length or end time of the reserved transmission. The synchronization packet can be arranged so that all terminals in the group will perform a calculation to predict the end of transmission upon receipt of the synchronization packet. As shown at block 112, at the predicted end of transmission, the next terminal in the queue will begin its transmission. As shown at block 114, this process is continually repeated until there are no longer any terminals in the group who want to transmit a signal.

The reservation request packet can be transmitted on a normal contention channel using any desired contention protocol, or can be transmitted on a dedicated reservation channel, or any other access channel by which a packet may reach the router, such as on the reserved channel resource itself. Thus, the present invention provides an access protocol which ensures all terminals of a group of transmitting terminals receive the necessary reservation information. With such an arrangement, efficient sharing of resources in a multi-beam communication system can be achieved without requiring any additional circuitry or programming in the satellite relay system 14, and without requiring the destination terminal to transmit an acknowledgement. This, in turn, decreases the amount of time necessary for determining the reservation queue. The shared resource can be one or multiple channels depending on the aggregate throughput desired for the group.

While the best mode for carrying out the invention has been described in detail, those familiar with the art to which this invention relates will recognize various alternative designs and embodiments for practicing the invention as defined by the following claims.

What is claimed is:

1. In a random-access, multiple-path, packet-based communication system having a plurality of transceiver terminals communicating with each other, and a packet router for routing transmitted signals to a destination transceiver terminal, a reservation request method for reserving transmit channel resources between a group of terminals comprising the steps of:

in each terminal wanting to make a transmission, assembling a reservation request packet comprising an address header identifying the entire group of terminals as the destination for the reservation request packet, and a data segment identifying the transmitting terminal and the channel resources to be reserved;

transmitting each reservation packet through the packet router to each terminal identified in the address header;

determining locally at each terminal identified in the address header the order of transmission, said order depending on the sequence in which all reservation request packets are received from the router; and transmitting signals from each terminal in accordance with the order of transmission determined locally at each terminal identified in the address header such that the transmission processing is decentralized.

2. The method of claim 1 further comprising the step storing the order of transmission in each transceiver terminal in the group of terminals.

3. The method of claim 2 wherein each terminal determines whether the stored order of transmission has been updated within a predetermined period of time before assembling the reservation request packet.

4. The method of claim 1 wherein the router routes any received reservation request packets in accordance with a predetermined priority protocol.

5. The method of claim 4 wherein the predetermined priority protocol comprises a first-in-first-out protocol.

6. The method of claim 1 further comprising the steps of determining which terminal in the group is first in the order of transmission, and beginning transmission from the first terminal.

7. The method of claim 1 further comprising the steps of during a terminal's possession of the reserved channel resources, transmitting a synchronization packet to all terminals in the group indicative of the terminal currently in possession of the reserved channel resource and when that possession will end.

8. The method of claim 7 further comprising the steps of determining at each terminal when a reserved transmission will end based on the received synchronization packet, and beginning transmission at the next terminal in the order of transmission at the determined end time.

9. A random-access, multiple-path packet-based communication system comprising:

a plurality of transceiver terminals arranged in respective groups of terminals for sharing predetermined transmission resources of the multiple-path communication system, wherein each terminal comprises a processor and an encoder operative to form a reservation request packet comprising an address header identifying the entire group of terminals to which the transmitting terminal belongs as the destination for the reservation request packet, and a data segment identifying the terminal and the channel resources to be reserved; and a packet router in communication with each of said plurality of transceiver terminals using a predetermined one of the multiple paths, said router relaying all received reservation request packets to the addressed group of terminals, wherein the processor in each of said plurality of transceivers is further operative to determine locally the order of transmission, said order depending on the sequence in which all reservation packets are received from the router such that transmisison routing processing is decentralized from the packet router.

10. The system of claim 9 wherein each processor in said plurality of terminals is further operative to store the order of transmission.

11. The system of claim 9 wherein each processor in said plurality of terminals is further operative to determine whether the stored order of transmission has been updated within a predetermined period of time before forming a reservation request packet.

12. The system of claim 9 wherein said packet router comprises a processor operative to relay all received reservation request packets in accordance with a predetermined priority protocol.

13. The system of claim 12 wherein said predetermined priority protocol comprises a first-in-first-out protocol.

14. The system of claim 9 wherein said router comprises a satellite relay system.

15. The system of claim 9 wherein each processor and encoder in said plurality of terminals is further operative to transmit during possession of the reserved channel resources a synchronization packet indicative of the terminal currently in possession of the reserved channel resource and when that possession will end.

16. The system of claim 15 wherein each processor in said plurality of terminals is further operative to determine when a reserved transmission will end based on said synchronization packet.

* * * * *